US007260772B2

(12) United States Patent
Dodge

(10) Patent No.: US 7,260,772 B2
(45) Date of Patent: Aug. 21, 2007

(54) SYSTEM AND METHOD FOR CREATING A PERT CHART

(75) Inventor: William C. Dodge, Mukileto, WA (US)

(73) Assignee: The Boeing Company, Chicago, IL (US)

( * ) Notice: Subject to any disclaimer, the term of this patent is extended or adjusted under 35 U.S.C. 154(b) by 52 days.

(21) Appl. No.: 10/690,392

(22) Filed: Oct. 20, 2003

(65) Prior Publication Data
US 2004/0083480 A1 Apr. 29, 2004

Related U.S. Application Data

(60) Provisional application No. 60/420,467, filed on Oct. 22, 2002, provisional application No. 60/420,301, filed on Oct. 21, 2002.

(51) Int. Cl.
G06F 17/21 (2006.01)
(52) U.S. Cl. ..................................................... 715/500
(58) Field of Classification Search ................. 715/500
See application file for complete search history.

(56) References Cited

U.S. PATENT DOCUMENTS

| 5,608,874 | A | | 3/1997 | Ogawa et al. |
| 6,101,481 | A | * | 8/2000 | Miller ............................ 705/9 |
| 6,674,450 | B1 | * | 1/2004 | Toub et al. .................... 707/10 |
| RE38,633 | E | * | 10/2004 | Srinivasan .................... 707/10 |
| 6,834,285 | B1 | * | 12/2004 | Boris et al. ............. 707/103 R |
| 6,938,240 | B2 | * | 8/2005 | Charisius et al. ........... 717/104 |
| 2002/0107914 | A1 | * | 8/2002 | Charisius et al. ........... 709/203 |
| 2002/0188597 | A1 | * | 12/2002 | Kern et al. ..................... 707/1 |
| 2003/0061330 | A1 | * | 3/2003 | Frisco et al. ................. 709/223 |
| 2003/0233268 | A1 | * | 12/2003 | Taqbeem et al. ............... 705/9 |
| 2004/0083449 | A1 | | 4/2004 | Dodge |

(Continued)

FOREIGN PATENT DOCUMENTS

WO WO 00/77684 A1 12/2000

(Continued)

OTHER PUBLICATIONS

Marmel, Elaine, Microsoft Project 2000 Bible, Chapter 17—"Coordinating Multiple Projects" (IDG Books Worldwide, Inc., © 2000).*

(Continued)

Primary Examiner—Doug Hutton
(74) Attorney, Agent, or Firm—Wildman, Harrold, Allen & Dixon, LLP

(57) ABSTRACT

A method of creating a program management chart comprising the steps of displaying a plurality of tasks within a selected set of data as a first part of the program management chart; and displaying a task that is outside of the selected set of data but that is associated with at least one of the plurality of tasks within the selected set of data as a second part of the program management chart. A method of creating a program management chart comprising the steps of displaying a work breakdown structure tree associated with a project without accessing project data; selecting a subfolder within the work breakdown structure tree; and accessing task data associated with the selected subfolder within the work breakdown structure tree without accessing all of the project data.

6 Claims, 22 Drawing Sheets

U.S. PATENT DOCUMENTS

2005/0027582 A1* 2/2005 Chereau et al. ............ 705/9

FOREIGN PATENT DOCUMENTS

| WO | WO 02/01415 A2 | 1/2002 |
|---|---|---|
| WO | WO 02/001415 A3 | 12/2003 |

OTHER PUBLICATIONS

Pyron, Tim, Special Edition Using Microsoft Project 2000, Chapter 18—"Working with Multiple Projects" (Que Publishing, © 2000).*

Marmel, Elaine, Microsoft Project 2000 Bible, Chapter 6—"Understanding the Basics of Views" and Chapter 8—"Modifying the Appearance of Your Project" (IDG Books Worldwide, Inc., © 2000).*

International Search Report, PCT/US 03/033268, Oct. 20, 2003.

Microsoft, "Microsoft Project 98 User's Guide CD" *Microsoft Project 98 Documentation*. Oct. 1997. Retrieved from the Internet on Mar. 16, 2004: http://www.tech.purdue.edu/cimt/course/s/cimt342/CDOnline/nav/usrguide.htm.

Dodge. "From a Position of Power: Using the P3e Open Architecture to Build Custom Value-Added Tools" 2002 Primavera User Conference. Oct. 22, 2002. Retrieved from the Internet on Mar. 16, 2004: http://www.primavera.com/partners/pdf/From_Position.pdf.

Weyman. "The Case for a Process-Driven Approach to Data Warehousing" *Database and Network Journal*. vol. 27, No. 1 Feb. 1, 1997. A.P. Publications, London, GB.

Microsoft. "Microsoft Announces Microsoft Project 98" *Microsoft Presspass*. Sep. 29, 1997, Retrieved from the Internet of Mar. 16, 2004: http://www.microsoft.com/presspass/press/1997/Sept97/PROJ98PR.aspPublished.

Primavera. P3e and Primavera Enterprise Advanced Track Sessions. 2002 Primavera User Conference. Oct. 5, 2002. Retrieved from the Internet on Mar 16, 2004: http://web.archive.org/web/20021005200634/http://www.primavera.com/events/UC2002/P3e_Ent_Advanced.html.

* cited by examiner

SYSTEM AND METHOD FOR CREATING A PERT CHART

This application claims priority to U.S. Provisional Patent Application. No. 60/420,467, filed Oct. 22, 2002, the entirety of which is incorporated herein by reference. This application also claims priority to U.S. Provisional Application No. 60/420,301, filed Oct. 21, 2002, the entirety of which is incorporated herein by reference.

BACKGROUND OF THE INVENTION

1. Field of the Invention

The present invention relates generally to computer software applications and data. Even more specifically, the present invention relates to a system and method for creating a project management chart.

2. Discussion of the Related Art

Software applications have become widely used tools that are used in a variety of ways in everyday life. Project management applications, for example, process data that includes information about tasks that need to be done, the resources to perform the tasks, and deadlines that need to be met to stay on schedule.

A PERT chart is a project management tool used to schedule, organize, and coordinate tasks within a project. PERT stands for Program Evaluation Review Technique, a methodology developed by the U.S. Navy in the 1950's to manage the Polaris submarine missile program. A PERT chart presents a graphic illustration of a project as a network diagram consisting of number nodes (either circles or triangles or similar shapes) representing events, or milestones in the project linked by labeled vectors (directional lines) representing tasks in the project. The direction of the arrows on the lines indicates the sequence of tasks.

In the project management chart software market, for example, Microsoft Project®, Artemis® and Primavera® brand project management applications, are software programs where projects can be illustrated in a PERT chart or project management chart.

SUMMARY OF THE INVENTION

In one embodiment, the invention can be characterized as a method of creating a program management chart comprising the steps of displaying a plurality of tasks within a selected set of data as a first part of the program management chart; and displaying a task that is outside of the selected set of data but that is associated with at least one of the plurality of tasks within the selected set of data as a second part of the program management chart.

In another embodiment, the invention can be characterized as a method of creating a program management chart comprising the steps of displaying a work breakdown structure tree associated with a project without accessing project data; selecting a subfolder within the work breakdown structure tree; and accessing task data associated with the selected subfolder within the work breakdown structure tree without accessing all of the project data.

In a further embodiment, the invention may be characterized as a method of creating a program management chart comprising the steps of selecting one of a plurality of tasks within a program management chart; determining which of the plurality of tasks within the program management chart are predecessor tasks of the selected one of the plurality of tasks; determining which of the plurality of tasks within the program management chart are successor tasks of the selected one of the plurality of tasks; and displaying the program management chart with only the selected one of the plurality of tasks and the predecessor tasks or the successor tasks of the selected one of the plurality of tasks.

In yet another embodiment, the invention may be characterized as a method of creating a program management chart comprising the steps of selecting a task within a project, the task including a display data associated with the task; accessing a database comprising task data associated with the selected task, the task data including the display data and non-display data; and displaying the task data associated with the selected task.

In another embodiment, the invention can be characterized as a method of creating a program management chart comprising the steps of displaying a plurality of tasks forming the program management chart; displaying an interface for filtering the plurality of tasks; selecting a parameter value using the interface for filtering the plurality of tasks; displaying the program management chart with only those tasks having the parameter value.

In a subsequent embodiment, the invention may be characterized as a method of creating a program management chart comprising the steps of accessing a subset of data within a project; displaying a plurality of tasks associated with the subset of data; and displaying a task that is outside of the subset of data.

BRIEF DESCRIPTION OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION

The following description is not to be taken in a limiting sense, but is made merely for the purpose of describing the general principles of the invention. The scope of the invention should be determined with reference to the claims.

The present invention is a software application for use on a computer, e.g., a desktop computer and laptop computer. The application allows a user to extract schedule data into a program management chart. The software application has standard features of known project management chart applications, however the present invention incorporates many new features making the application more user friendly, more efficient and able to provide a user with more data than previous program management chart applications.

Figure 1:
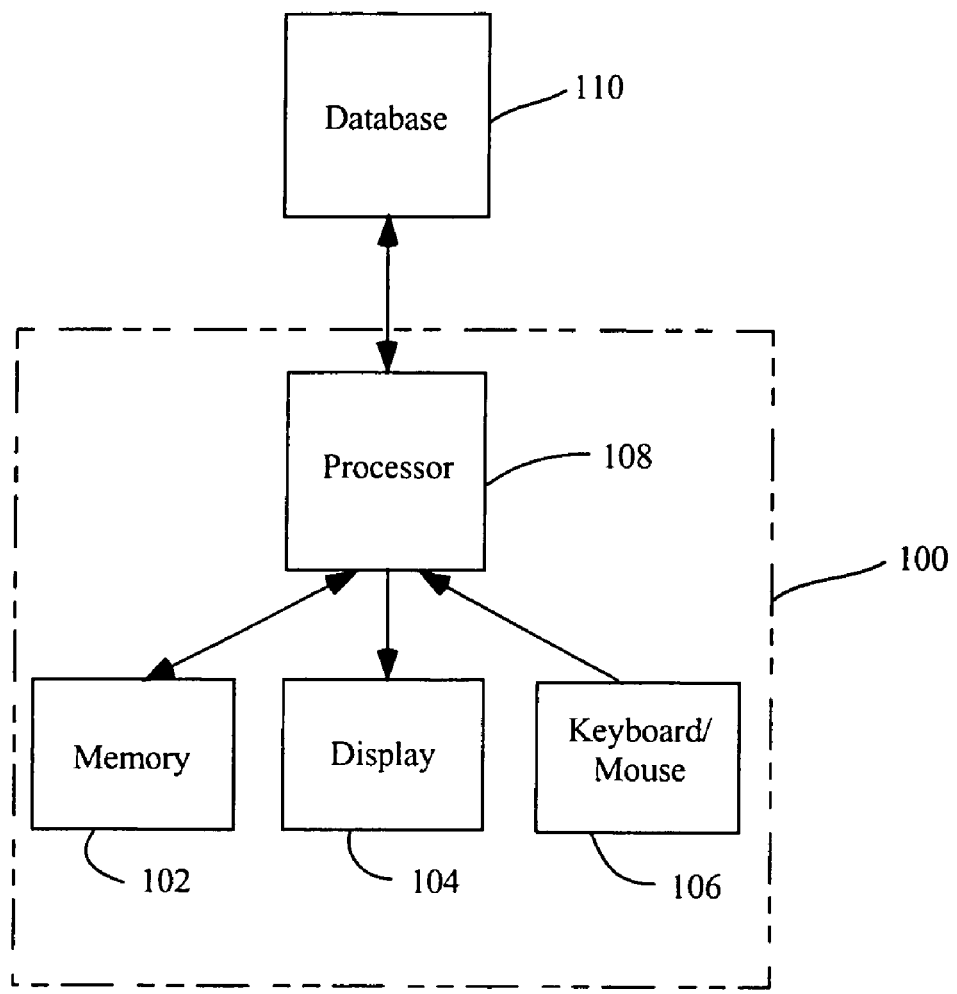
FIG. 1 is a block diagram illustrating a system in accordance with one embodiment of the present invention.

Referring to FIG. 1, a computer system is shown in accordance with the present invention. Shown is a computer 100, a processor 108, a memory 102, an input device 106, a display monitor 104, and a database 110.

The computer 100 includes the processor 108, the display monitor 104, the input device 106 and the memory 102. The computer 100 can be any type of computer such as is known in the art. For example the computer can be an IBM compatible computer, a Macintosh computer, a UNIX system, etc. The invention is not limited to the type of computer or type of hardware system that is being used, but rather can be implemented using combinations of hardware, software, or combination thereof, including, for example, general purpose and special purpose computers.

As shown, the database 110 is external to the computer 100, however, the data can in practice be stored in the memory 102 of the computer 100, and/or can be located remotely from or locally to the memory 102 of the computer 100. In one example, the data is stored in memory 102 located within a local area network (LAN) to which the computer is connected. The data regardless of where located can be stored on any type of memory device such as a CD-ROM, a floppy disk, RAM, ROM, a hard drive, etc. capable of storing the database 110.

Figure 2:
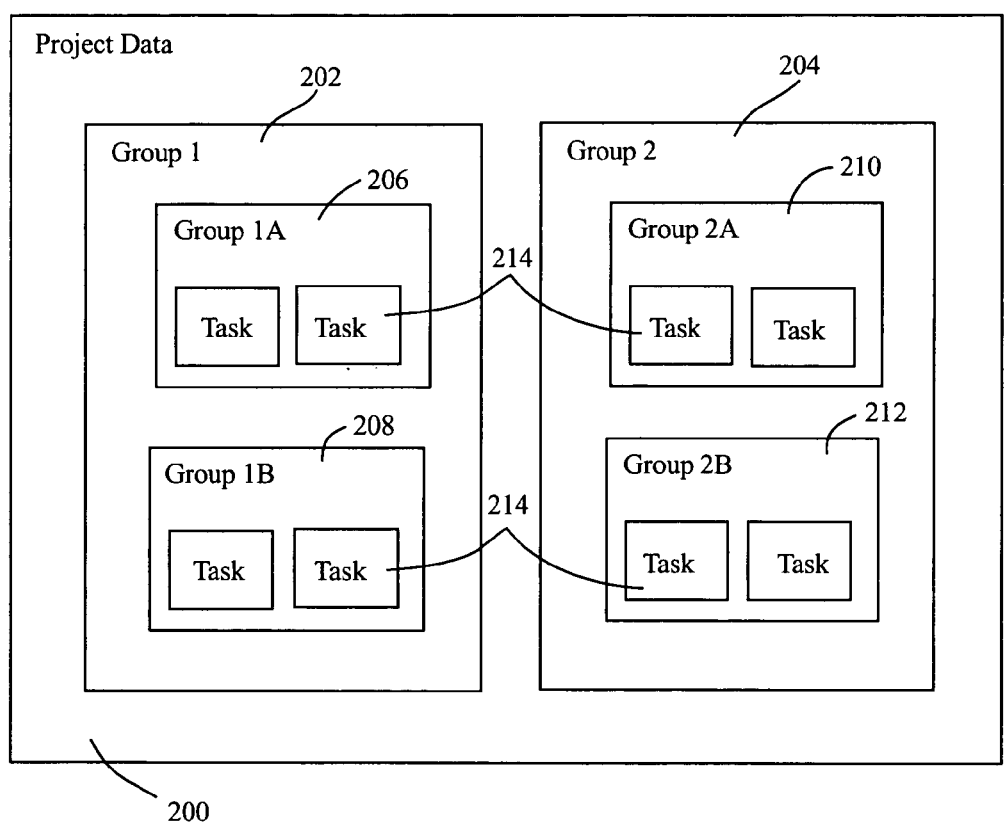
FIG. 2 is a block diagram illustrating an overview of the database shown in FIG. 1.

Referring next to FIG. 2, a block diagram is shown illustrating an overview of a database structure for the database 110 shown in FIG. 1. Shown is the project data 200, a first group of data 202, a second group of data 204, a first subgroup of data 206, a second subgroup of data 208, a third subgroup of data 210, a fourth subgroup of data 212, and task data 214.

All of the groups of data are related to a work breakdown structure tree (described with reference to FIG. 4). The database structure provides for a system where a user can access task data 214 within a project without having to open all of the project data 200. Prior designs require all of the project data 200 to be opened by the computer before a user can access the task data 214. In accordance with a preferred embodiment, any group of data within the project can be accessed and a corresponding project management chart displayed. For example, a user can select the first subgroup of data 206. The selection of the data will be described further herein with reference to FIGS. 3 and 4. The data is then accessed only for the tasks within the first subgroup of data 206 and a corresponding program management chart will be displayed. This provides for a huge savings in system resources as compared with prior designs, as in prior designs if a user wanted to access only the first subgroup of data 206, all of the project data 200 would be opened and then the unwanted portion of the program management chart would be filtered to display only the desired section of the program management chart.

In accordance with a preferred embodiment, the project data 200 is stored such that any of the different groups can be opened without opening the data in a larger group. Additionally, a program management chart associated with a smaller group of data can be displayed without having to access a larger group of data. For example a user can open the second group of data 204 without opening the first group of data 202 or the project data 200 and then display a program management chart for only the second group of data 204.

Figure 3:
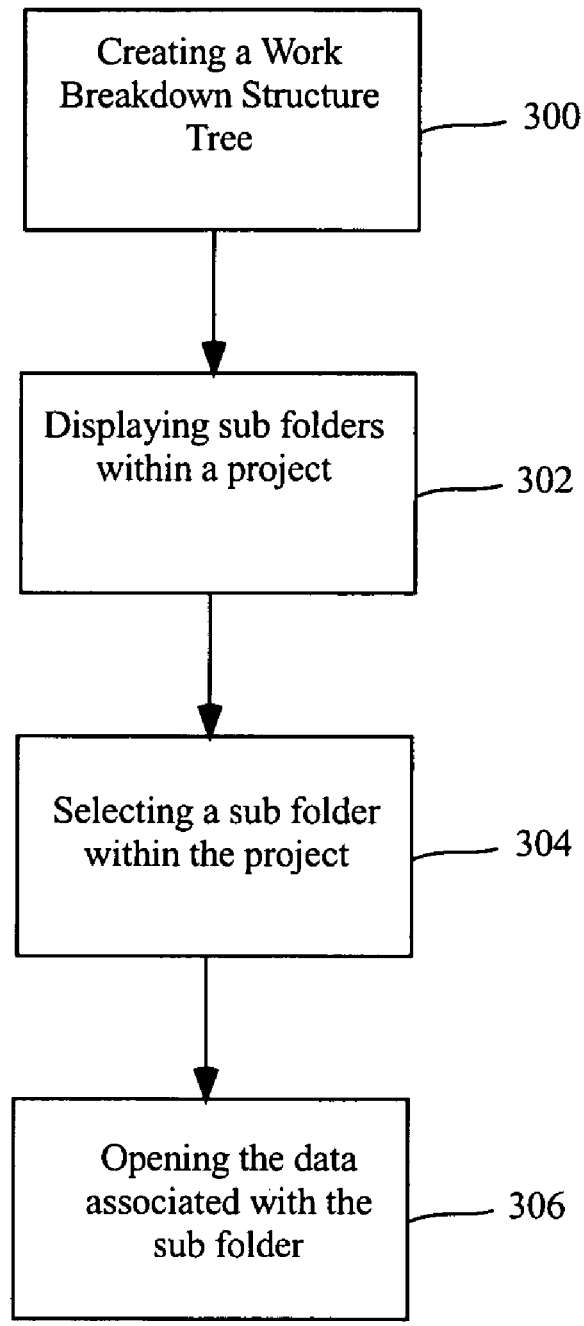
FIG. 3 is a flow diagram illustrating a method of accessing data within a project in accordance with another embodiment of the present invention.

Referring next to FIG. 3, a method is shown for displaying a program management chart in accordance with the present embodiment.

Figure 4:
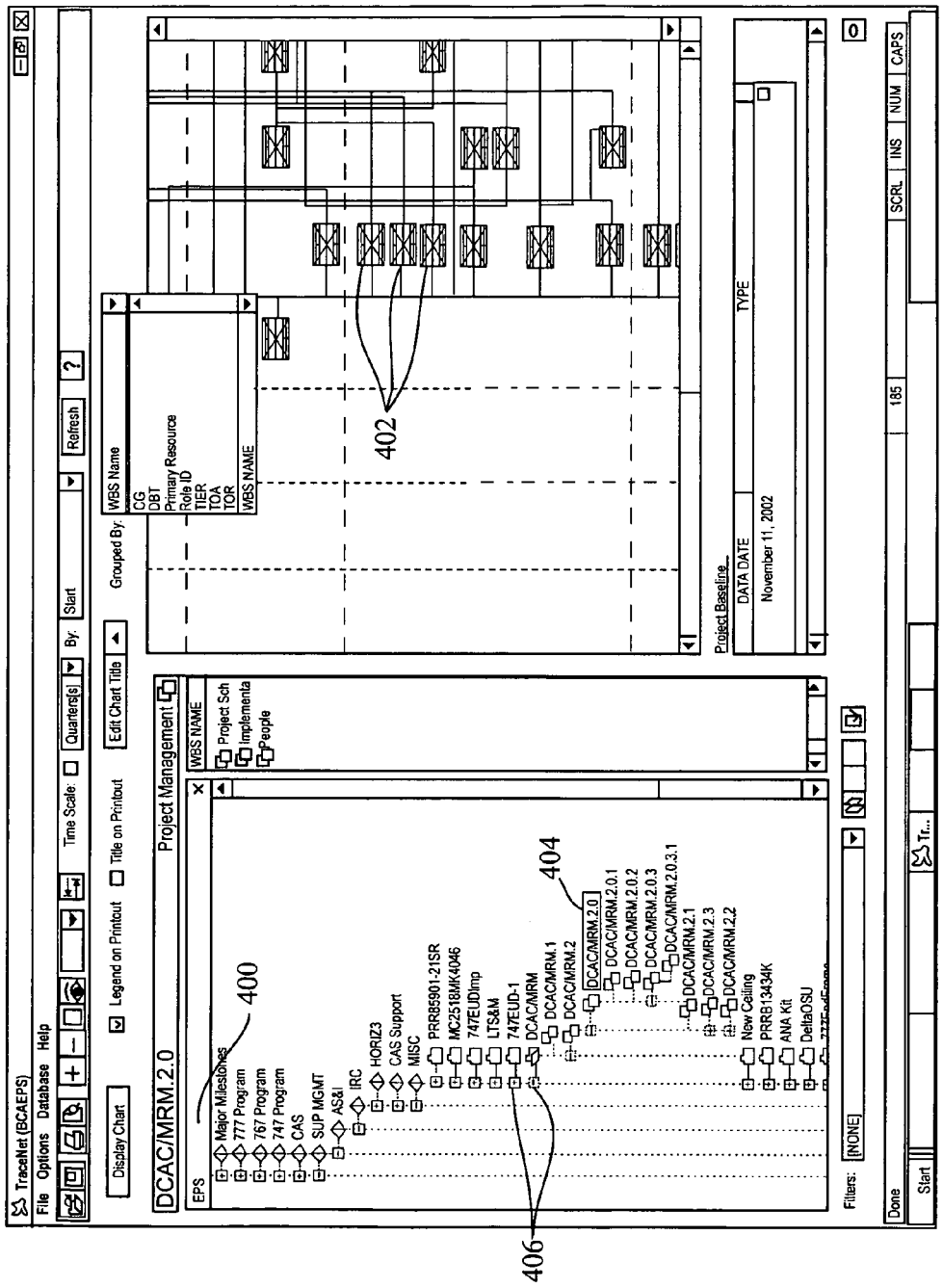
FIG. 4 is a diagram illustrating a work breakdown structure tree and program management chart in accordance with one embodiment of the present invention.

First, a work breakdown structure (WBS) tree, shown in FIG. 4, is created 300 by forming an expandable table. The expandable table is representative of the different projects available to a user and the different levels within a project. Any project can have one or more levels associated within the project. The WBS allows a user to see an overview of different projects without accessing the data that is part of the project.

Next, the WBS tree can be expanded and collapsed for any given project, thus exposing sub folders within a project 302. Each of the sub folders generally relates to different parts of the projects. As shown, each sub folder can be further divided into its own subfolders. This can be repeated as many times as is necessary in order to properly define different parts of the project. Each of the subfolders can be representative of one of the groups of data shown in FIG. 2.

Next, in operation, one of the sub folders is selected 304. This displays the different tasks associated with the selected sub folder. The data associated with the sub folder is then accessed after the selection of the subfolder and the tasks associated with the sub folder are then displayed. In prior designs, in order to access sub folders within a project, all of the data associated with the project must first be accessed. Next in the prior designs when a sub folder is selected, the data is filtered to only show those tasks within the subfolder. Advantageously, by creating a WBS Tree which can be viewed without accessing the data associated with the selected project, computer resources are greatly conserved. As described with reference to FIG. 2 when a subfolder is selected, the subfolder will only open the data associated with the subset of data and the corresponding program management chart will be displayed.

Referring next to FIG. 4, shown is a diagram illustrating a WBS tree and a program management chart in accordance with the present embodiment. Shown is the WBS tree 400, a subfolder 404, expand and minimize boxes 406, and a plurality of tasks 402.

As is shown the WBS tree 400 has been selected at the subfolder 404 within the project, thus the portion of the database associated with the subfolder 404 is accessed and the plurality of tasks 402 are displayed. A user can further click on expand and minimize boxes 406 in the WBS Tree 400 to expand or compress the tree, thus allow for a further subfolder within the project to be selected. This greatly increases the efficiency of the project management chart as the data for the entire project, which can be an extremely large amount of data, does not all have to be accessed at the same time.

Figure 5:
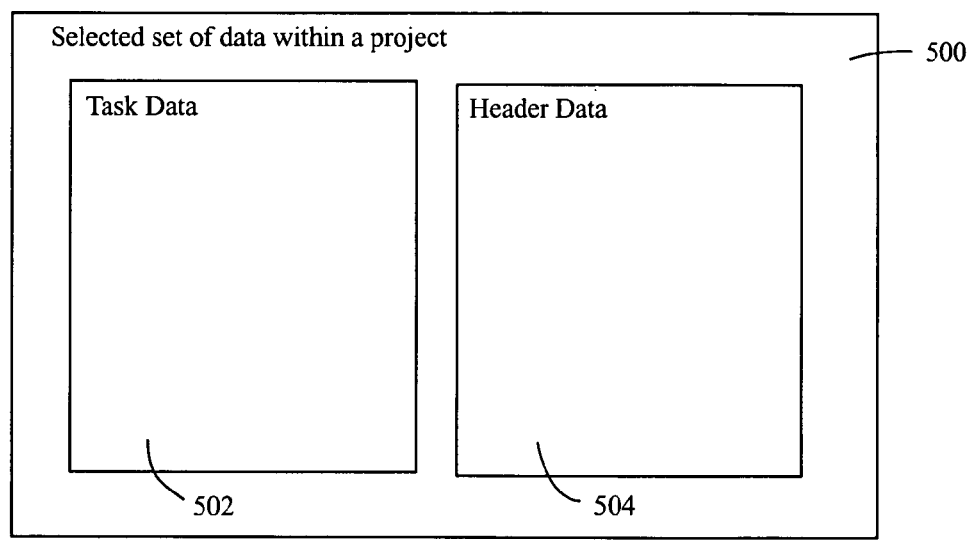
FIG. 5 is a block diagram illustrating an overview of a subset of data within a project.

Referring to FIG. 5, a block diagram is shown illustrating the data associated with a selected set of data. Shown is a selected set of data 500, task data 502, and header data 504. Both the task data 502 and the header data 504 are associated with, for example, the subfolder 404 shown in FIG. 4.

The task data 502 is all of the data associated with the tasks within the subfolder 404. This can be any amount of data. Generally a subset of the task data is shown inside of the displayed task of the program management chart. As will be described further herein with reference to FIGS. 10-12, all of the task data 502 is accessible through the selection of one of the tasks in the program management chart.

The header data 504 is data that is related to tasks outside of the selected set of data but is related to the tasks within the selected set of data 500. The header data 502 allows a representation of a task to be displayed in the program management chart without having all of the data associated with the task open. This greatly increases the system resources as data for tasks outside of the selected set of data is not accessed but the header data 504 can still show a representation of a task.

Figure 6:
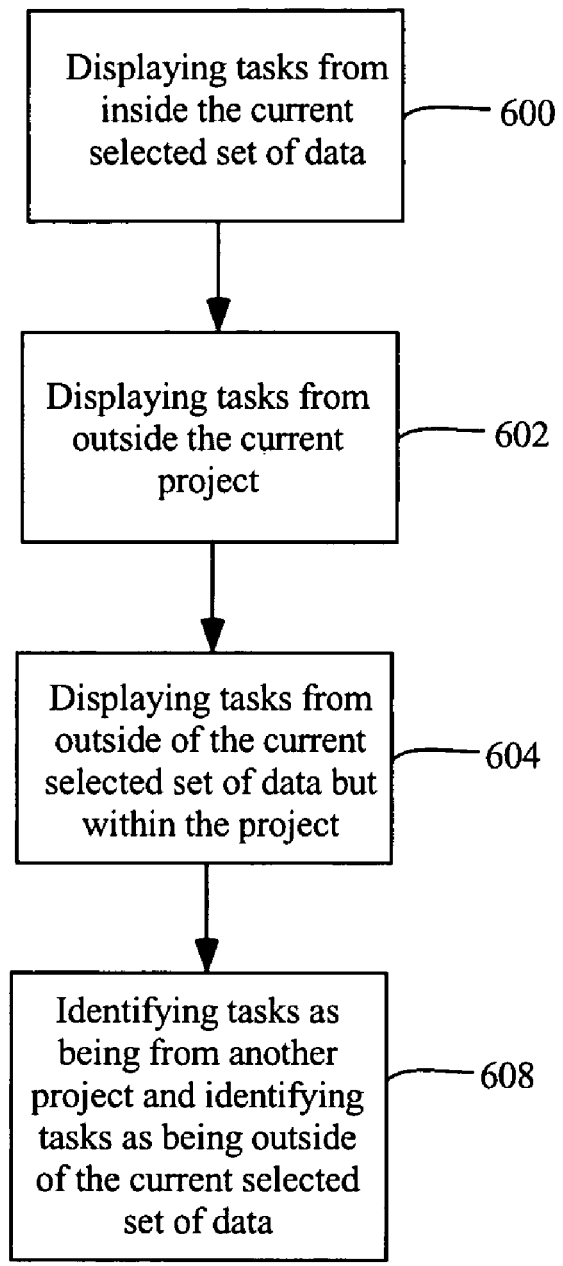
FIG. 6 is a flow diagram illustrating a method of displaying tasks of a program management chart in accordance with a further embodiment of the present invention.

Referring to FIG. 6, shown is a flow diagram illustrating a method of displaying tasks in a program management chart in accordance with the present embodiment. As described above with reference to FIG. 5, tasks within the selected set of data and tasks outside of the selected set of data may be displayed in a program management chart.

In operation, the tasks within the selected sub folder of a project are displayed 600 and form part of the project management chart.

Additionally, tasks can be displayed that are predecessor or successor tasks to any of the displayed tasks but that are not part of the current project 602. The tasks that are outside of the current project are displayed such that they can be differentiated by a user. For example, a task outside of the project can be an oval shape, while a task within the currently opened data set is rectangular shaped. The data associated with the task outside the project is not currently open. In order to access the data that is associated with the task outside of the project a user selects the task. Only then is the data associated with the task opened. Additionally, the present design allows for only the data associated with the selected task to be opened. Prior designs must open the entire other project in order to access the data that is associated with the one selected task. Thus, the current design uses the computer resources in a much more efficient manner than prior designs. As described above, the current embodiment has header data that is used to display the tasks outside of the current project.

Additionally, tasks that are outside of the currently opened data set can be displayed 604. These are tasks that are within the current project, however are outside of the selected subfolder of the project. The tasks are displayed such that they can be differentiated by a user from both tasks within the opened data set and tasks outside of the project. For example, in one example the task shape is a triangle. The header data is also used to display the tasks that are outside of the currently opened data set.

Figure 7:
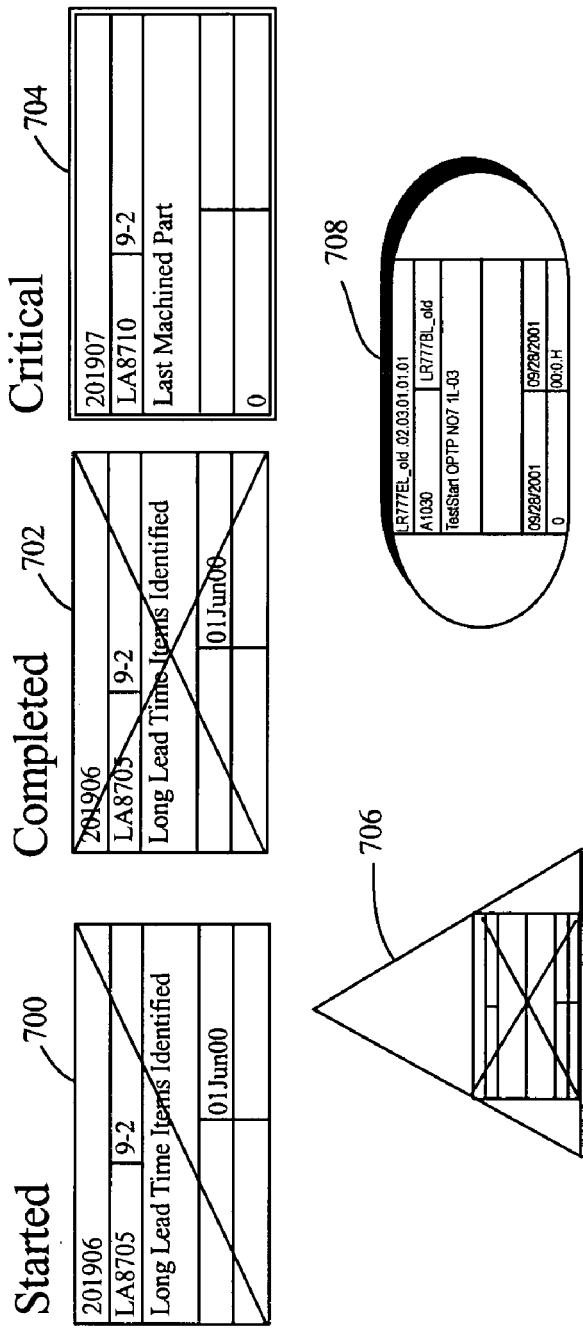
FIG. 7 is a diagram illustrating different task representations in accordance with a program management chart of yet another embodiment of the present invention.

Referring to FIG. 7, shown are examples of different representations for tasks within a project management chart. Shown is a started task 700, a completed task 702, an non-started task 704, a completed activity outside of the WBS selection 706, and a non-started task outside of the project selection 708. The different types of tasks are conveniently shown in different shapes and have different markings in order for a user to easily differentiate one task from another. The shapes shown are for representation only and any means of differentiating between different types of tasks may be used.

Figure 8:
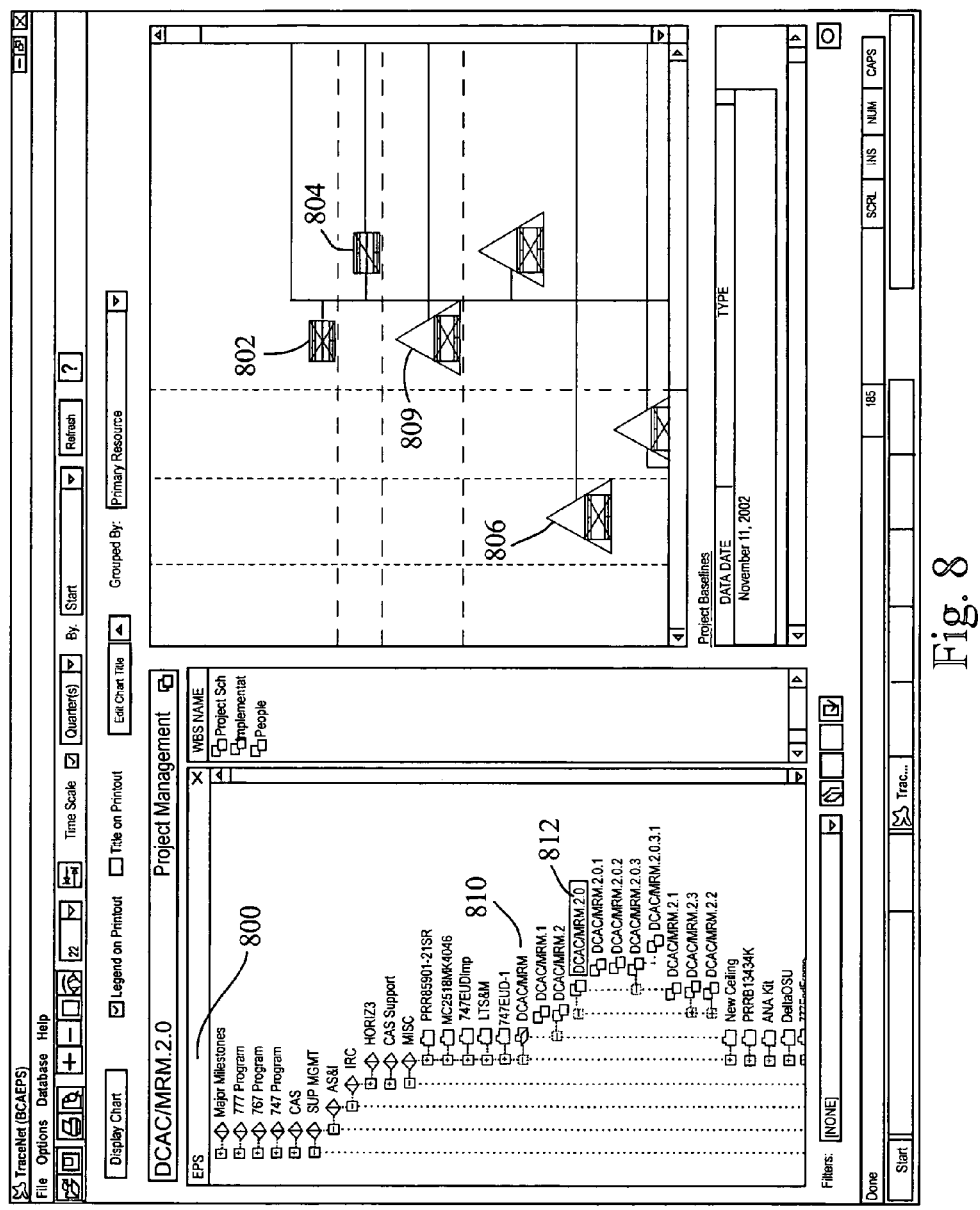
FIG. 8 is a diagram illustrating a work breakdown structure tree and program management chart in accordance with another embodiment of the present invention including tasks having different task representations.

Referring next to FIG. 8 a diagram is shown illustrating a selected sub folder and the program management chart associated with the selected sub folder. Shown is a WBS tree 800, a completed task 802, a started task 804, a finished task outside of the current data set 806, a necessary task outside of the current data set 809, a project level within the WBS tree 810, and a selected subfolder 812 within the WBS tree.

In one embodiment, a user will expand the WBS tree 800 to the project level 810. Next the user will select the subfolder 812 within the WBS tree. When the user selects the subfolder 812, the data associated with the subfolder 812 is then opened and the project management chart is created. Within the task data 502 associated with the subfolder 812 is the data for all of the tasks within the subfolder 812. Additionally, header data 504 is located within the data set. The header data 504 from FIG. 5 can be either for tasks that are inside of the current project, but outside of the currently opened data set or for tasks that are located outside of the current project. This allows a user to be able to view a task that is outside of the currently opened data set without actually accessing all of the data associated with the task. This saves valuable system resources. When the task is outside of the current project, the data is stored within the other project. While the user can see the task that is outside of the current project, in order to actually access all of the data associated with the task, the other project will have to be opened or a subfolder within the project will have to be opened in order for the data to be available.

Figure 9:
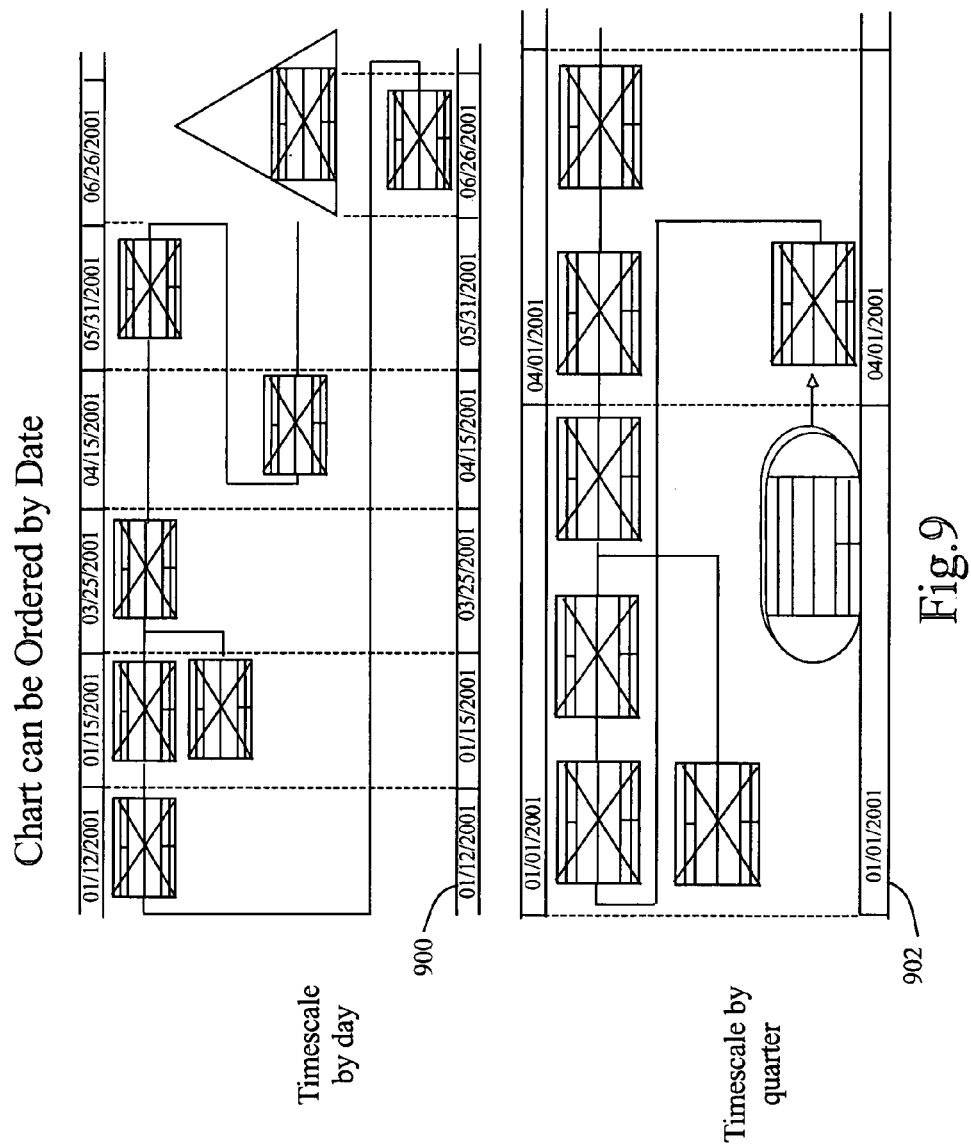
FIG. 9 is a diagram illustrating one embodiment of the present invention for displaying a program management chart by different timescales.

Referring next to FIG. 9, a program management chart is shown that is able to timescale the tasks. Shown is a plurality of tasks, a first time scale 900, and a second time scale 902.

In accordance one embodiment the plurality of tasks are placed on the time scaled chart according to when the task needs to be accomplished. The first time scale shows a program management chart with each division corresponding to one day. The second time scale shows a program management chart with each division corresponding to a quarter of a year. It is possible to use any division of time that a user wishes to view the program management chart with. Additionally, the tasks can be placed into the different divisions of time either by the completion date of the task or the start date of the task.

Figure 10:
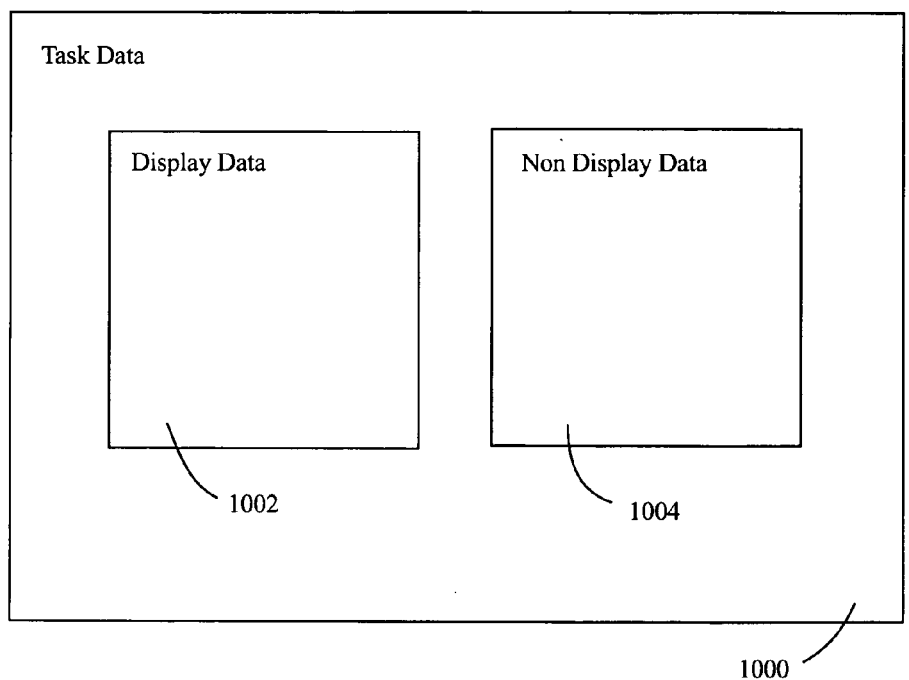
FIG. 10 is a block diagram illustrating data associated with a task.

Referring to FIG. 10 a block diagram is shown illustrating data associated with a task. Shown is all of the task data 1000, display data 1002, and non-display data 1004.

Each task within a project has task data 1000 associated with the task. In prior program management chart programs, all of the task data was shown in the task box in the program management chart. In accordance with one embodiment of the present invention, only a portion of the data associated with the task is shown in the program management chart, i.e., the display data 1002. Additionally, each task has more data associated with it that is not shown in the program management chart, i.e., non-display data 1004. This allows a task to have much more data associated with it without having to display all of the data in the program management chart. Preferably, the display data 1002 and non-display data 1004 are user changeable, such that the most pertinent or user desired data is the display data 1002 and the rest of the data is non-display data 1004.

Figure 11:
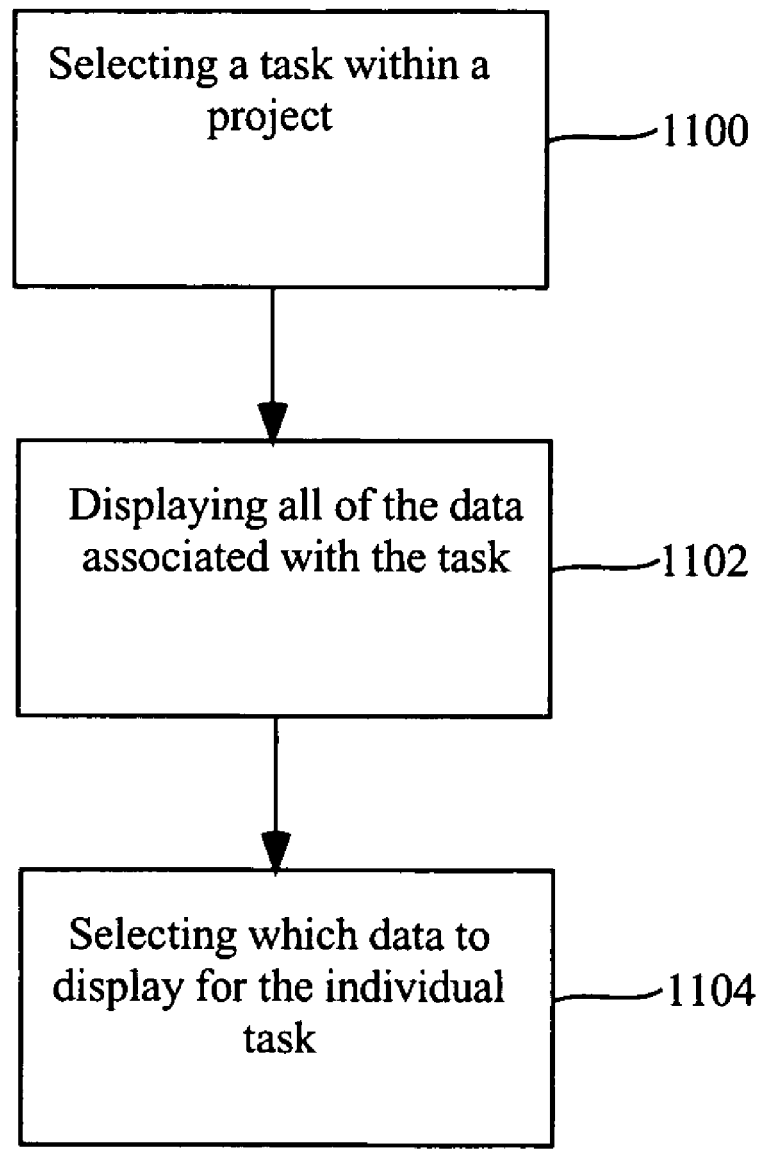
FIG. 11 is a flow diagram illustrating a method of displaying data associated with a task in accordance with an additional embodiment of the present invention.

Referring to FIG. 11 a flow diagram is shown illustrating a method for displaying data within a task.

First a user selects a task from the program management chart 1100. Generally the task is within the opened set of data, such as is described earlier. However, the task can be a task that is outside of the currently opened data set, e.g., a task outside of the current project or a task outside of the currently selected sub folder.

Next all of the data for the selected task is displayed 1102. Generally, a task box within the program management chart has only a portion of the data for the task actually displayed within the task box. However, when a user selects a task, the full set of data associated with that task can then displayed. If the task is outside of the currently opened data set, the sub folder where that task is located will be opened, thus giving access to the full set of data associated with that task.

A user is then able to select a sub set of data from the full set of data that the user would like to display within the task box 1104. This allows a user to have different fields of data displayed for different tasks within the program management chart. Prior designs require that a user designate the display fields for the entire project and do not allow them to be changed for individual tasks within the project.

Figure 12:
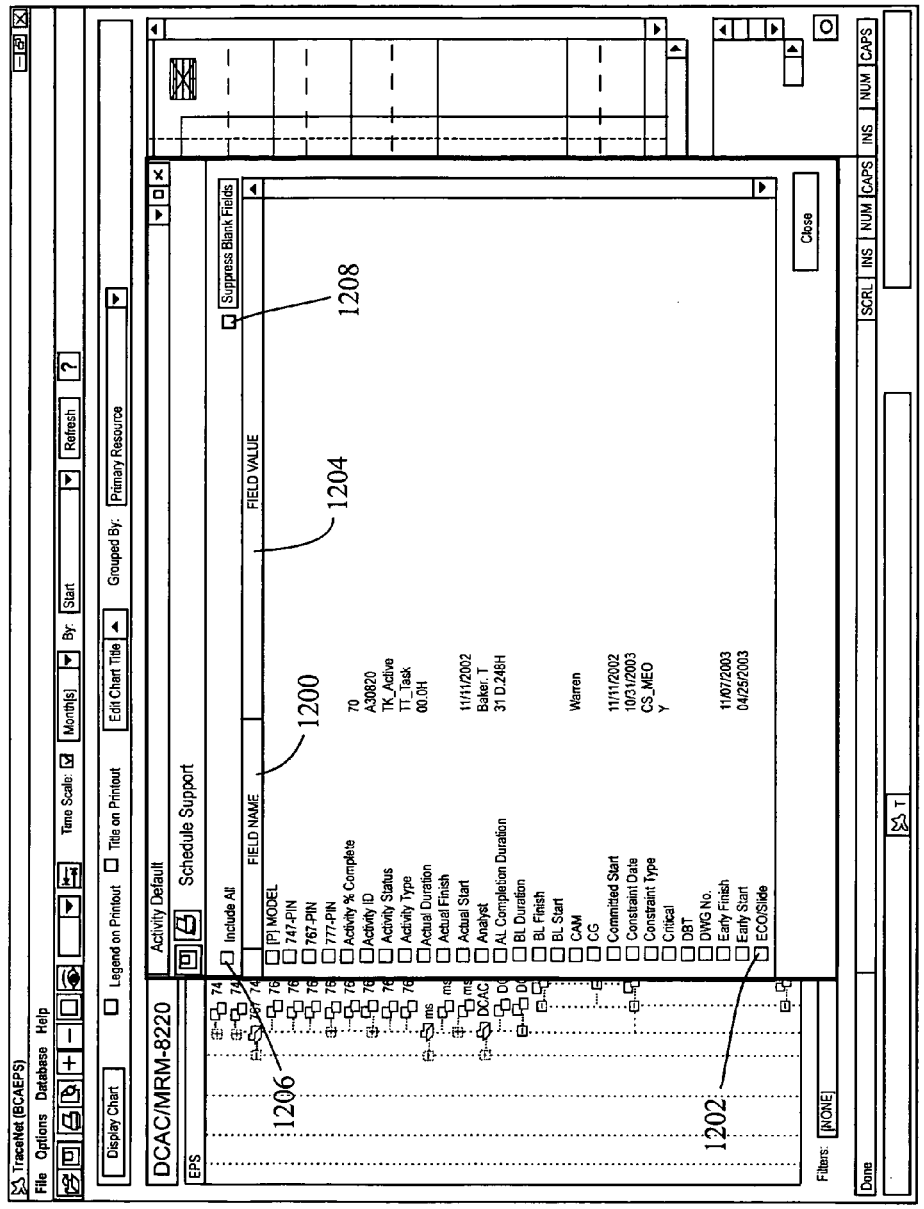
FIG. 12 is a diagram illustrating one embodiment of displaying data associated with a task in accordance with the method of FIG. 11.

Referring to FIG. 12 a diagram is shown illustrating one embodiment of displaying the full set of data associated with a task.

Shown is a plurality of field names 1200, a plurality of selection boxes 1202, a plurality of field values 1204, an include all box 1206, and a suppress blank fields box 1208. Each of the plurality of field names 1200 includes one of the plurality of selection boxes 1202. The selection boxes 1202 allow the user to select the data that will be shown in the task that is part of the program management chart. The include all box 1206 allows a user to display all of the data associated with the task in the task box. The suppress blank fields box 1208 allows a user to only view those field names that have a corresponding data entry in the field value 1204. This is one embodiment that allows a user to select and change the display fields within the task box, however, many other interfaces can be used in accordance with the present invention.

Figure 13:
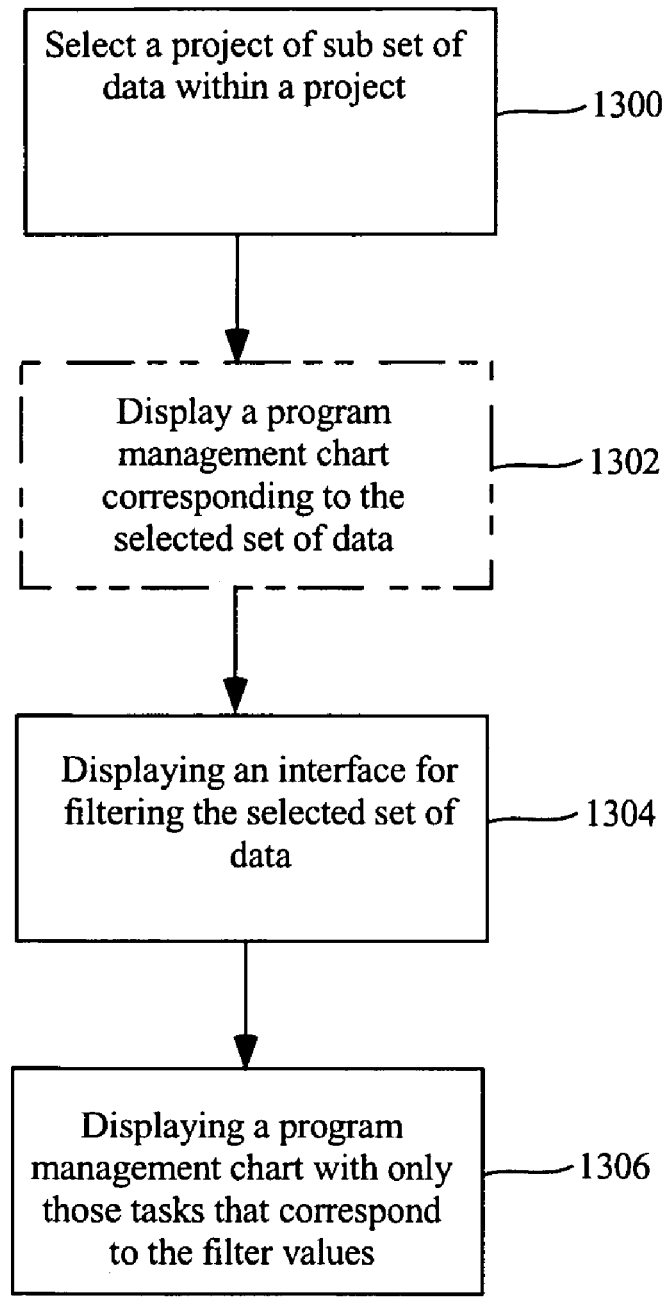
FIG. 13 is a flow diagram illustrating a method of filtering tasks in accordance with yet a further embodiment of the present invention.

Referring to FIG. 13, a flow diagram is shown illustrating for filtering data in accordance with the display of a program management chart.

First a project or sub-set of data within a project is selected 1300. A program management chart corresponding to the selected data can then be displayed 1302. Next a user can select a set of filtering criteria through a user interface 1304. A program management chart is then displayed showing only those tasks that meet the filtering criteria previously selected by the user 1306. Advantageously, this allows a user to display a program management chart specific to the users needs.

Figure 14:
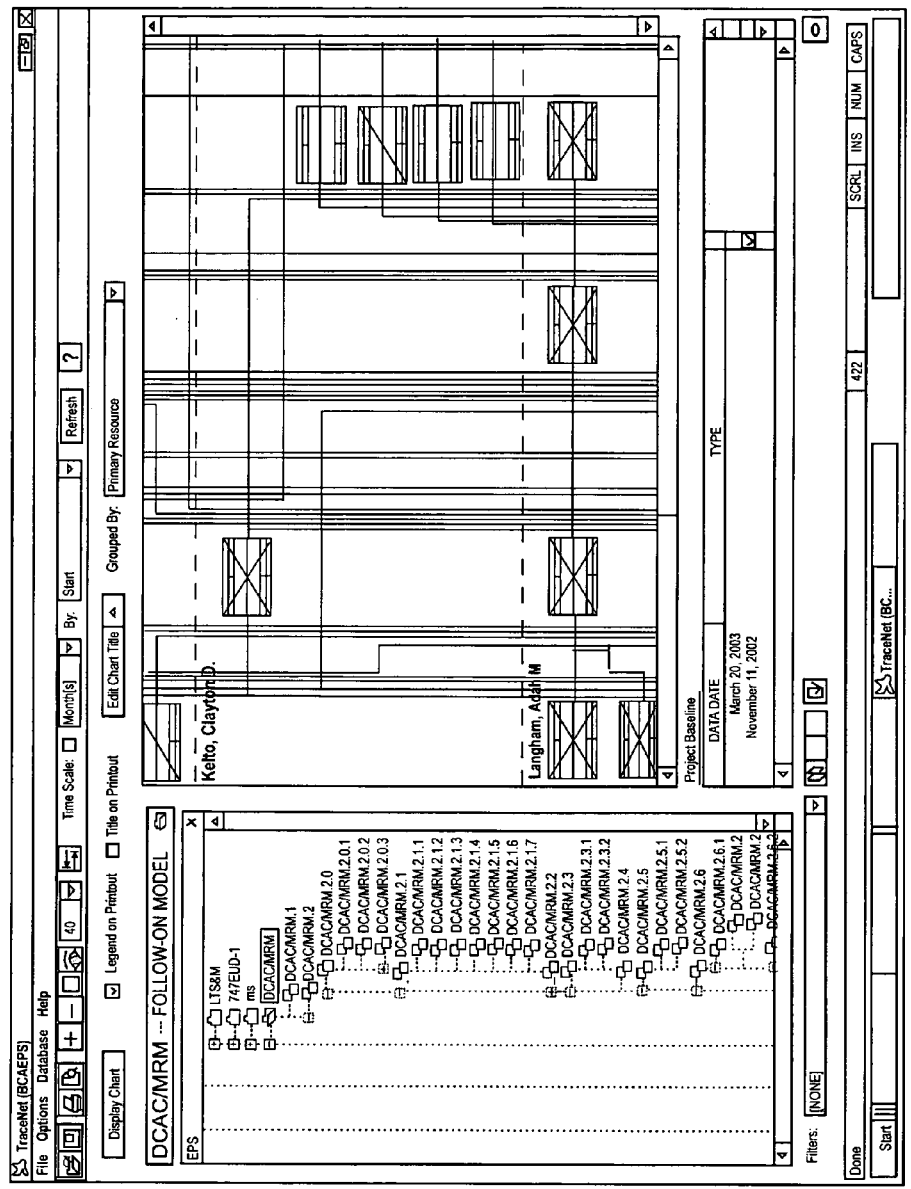
FIG. 14 is a diagram illustrating a program management chart before filtering tasks in accordance with the method of FIG. 13.
Figure 15:
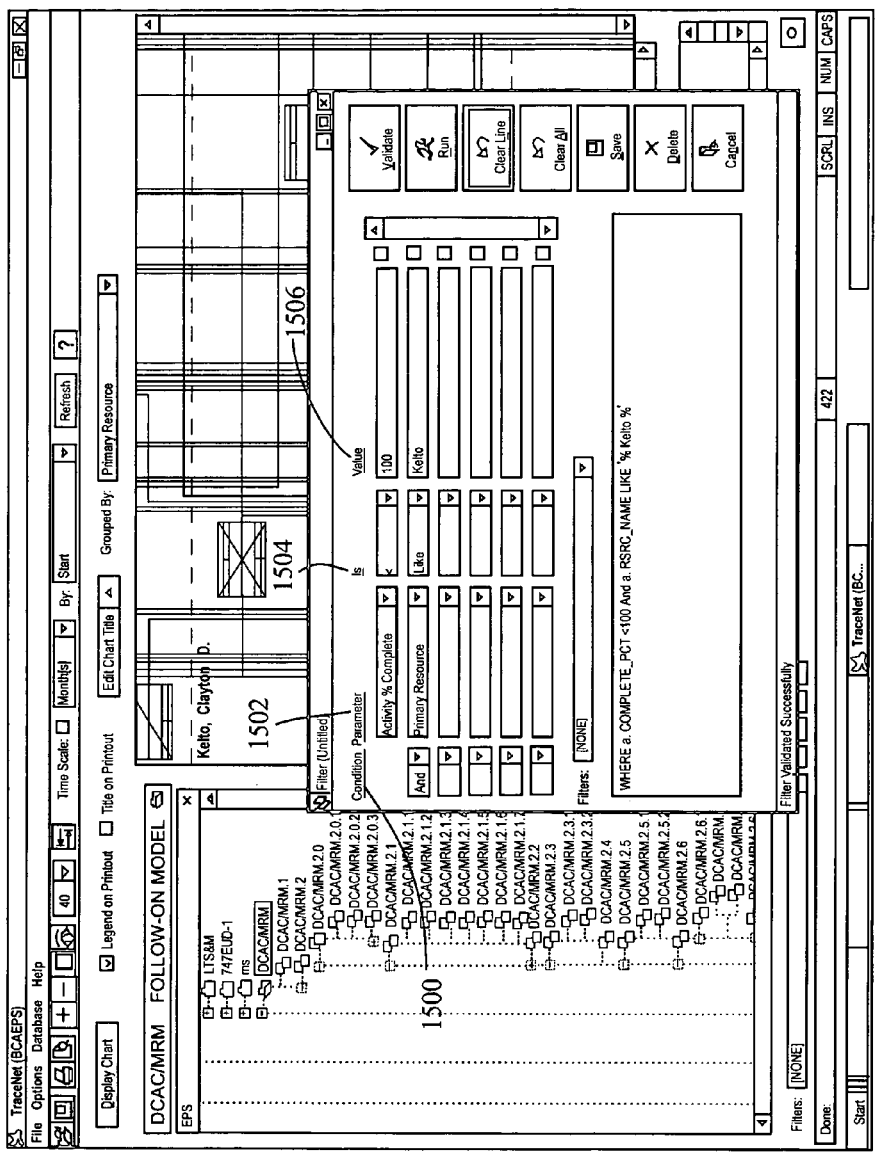
FIG. 15 is a diagram illustrating one example of an interface for filtering tasks in a program management chart.

Referring to FIG. 14, a diagram is shown displaying a program management chart before filtering data associated with the shown tasks. The program management chart is shown for the entire set of selected data Referring to FIG. 15, a diagram is shown illustrating a filtering interface for filtering the task boxes that are in the program management chart shown in FIG. 14. Shown is a condition field 1500, a parameter field 1502, a determination field 1504, and a value field 1506.

A user is able to set the parameter field 1502 to select the type of data they would like to filter the program management chart by. The parameter field 1502 is dependent upon which data fields are used in the current project or selected sub level within the project. Next a user can then enter into the value field 1506 the data to search for and filter within the selected parameter field 1502.

The condition field 1500 is used to be able to determine the relationship between the different parameter fields. The condition field 1500 can have values such as "and, or, and not," etc. The determination field 1504 is used to show the relationship between the parameter field and the value field.

Thus, in operation, the filtering interface allows a user to view only those tasks within the project that meet the filtering criteria. This can be very beneficial to as user who would only like to view the tasks that they are responsible for. In this example, the user would select the parameter field 1502 to be "primary resource" and enter their own name into the value field 1506. The project management chart will then only show task for which the user is entered as the "primary resource" in the database.

In another example, a project manager could filter out all tasks which have not been completed. This would allow the project manager to easily view the progress of the project. Any data that is in the database can be filtered and the corresponding tasks that meet the filter criteria will be displayed.

Figure 16:
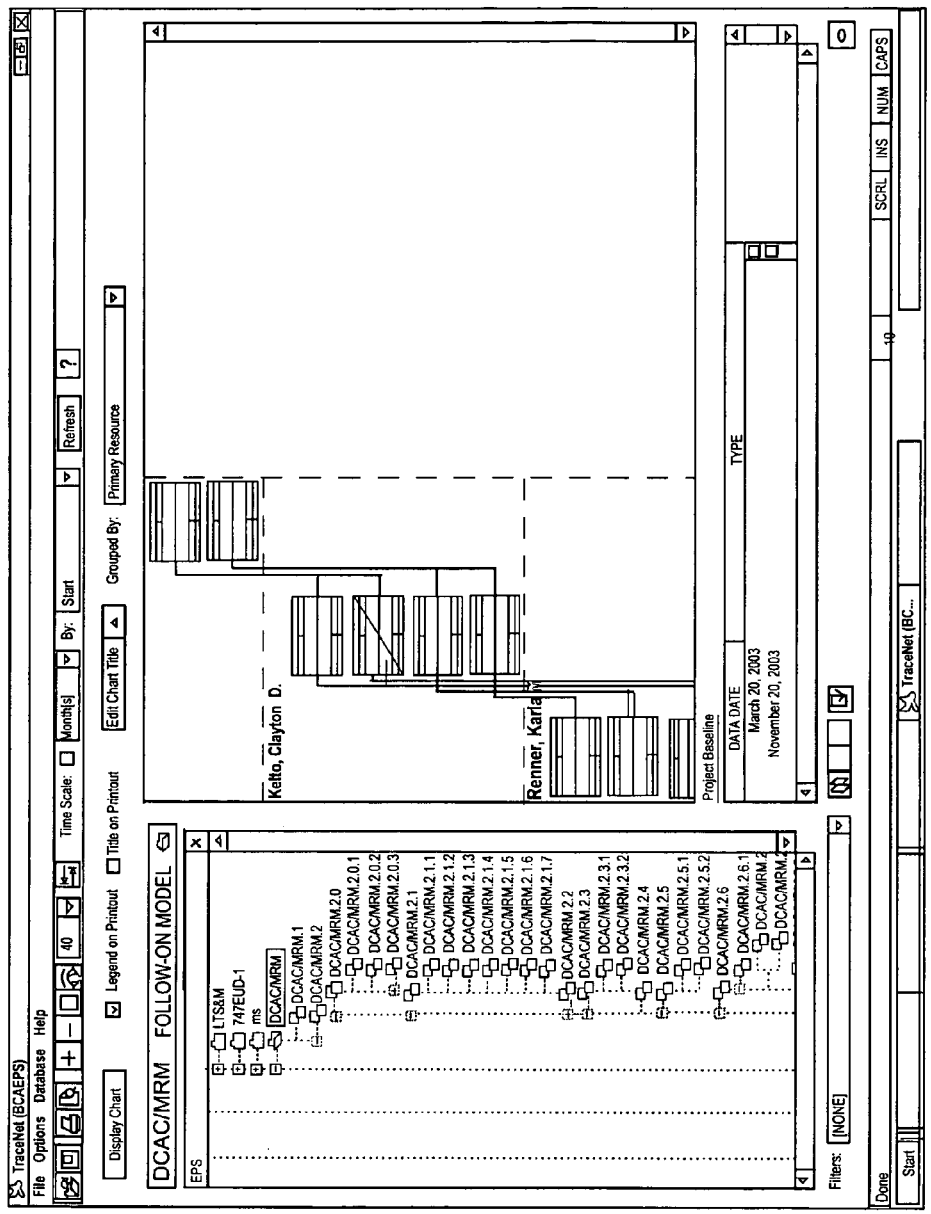
FIG. 16 is a diagram illustrating one example of a program management chart after filtering tasks in accordance with the method of FIG. 13.

Referring to FIG. 16, a diagram is shown displaying a program management chart after filtering data associated with the shown tasks. Shown is a program management chart that includes only the tasks that meet the criteria selected in the filtering interface shown in FIG. 15. Thus, a smaller number of tasks are shown in the program management chart as compared with the program management chart shown in FIG. 14.

Figure 17:
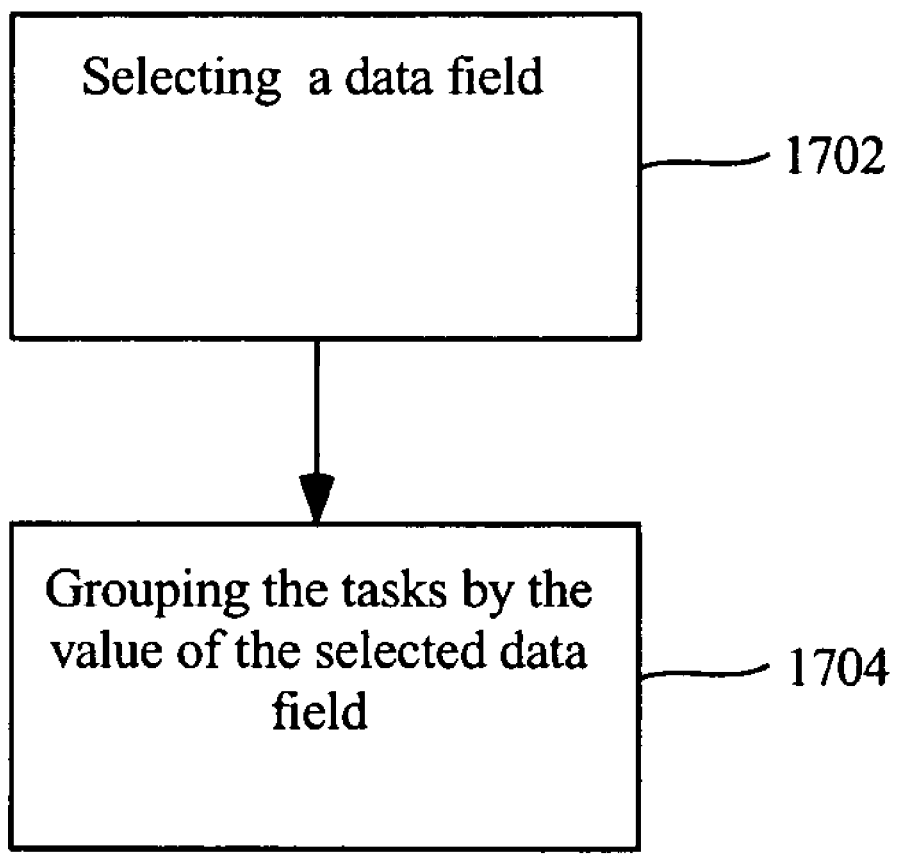
FIG. 17 is a flow diagram illustrating a method of grouping tasks by a parameter value within a program management chart.

Referring to FIG. 17, a flow chart is shown illustrating a method of displaying tasks within the program management chart.

First, a user selects the data field they would like to group 1702. For example, if a user would like to view all the tasks within the selected data set, however, they would also like to easily view who is the "primary resource" for each of the tasks, then the user would select "primary resource" as the parameter for grouping.

Next, the tasks within the selected data set are grouped together for the selected parameter while still maintaining the relationships between the tasks 1704. One example of displaying the tasks in a grouped manner is shown in FIG. 18.

Figure 18:
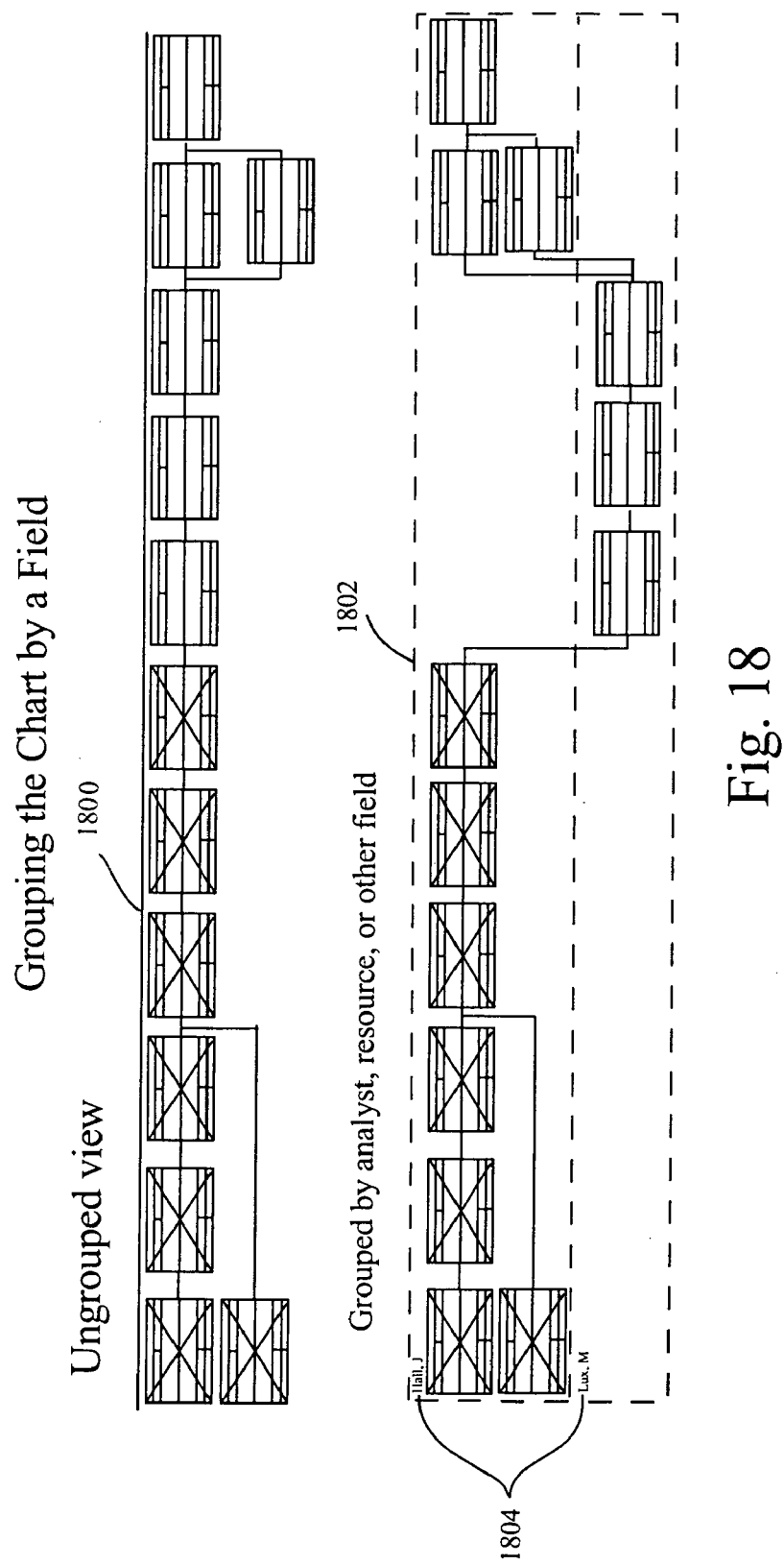
FIG. 18 is a diagram illustrating one example of displaying a program management chart that is grouped by a parameter value.

Referring next to FIG. 18, a diagram is shown illustrating one example of displaying grouped tasks according to the method shown in FIG. 17. Shown is an ungrouped view 1800 of a program management chart, a grouped view of the program management chart 1802, and a plurality of group values 1804.

In this embodiment, the grouped view of the program management chart has been grouped by "primary resource." The plurality of group values 1804 shows two different people who are the "primary resource" for the tasks.

The grouped view 1802 advantageously shows the different tasks separated into groups depending upon who is in charge of the task. This view makes it vary easy for a project manager to determine the workload of everyone working on the project at the same time. The program management chart can be grouped by any parameter within the database.

Figure 19:
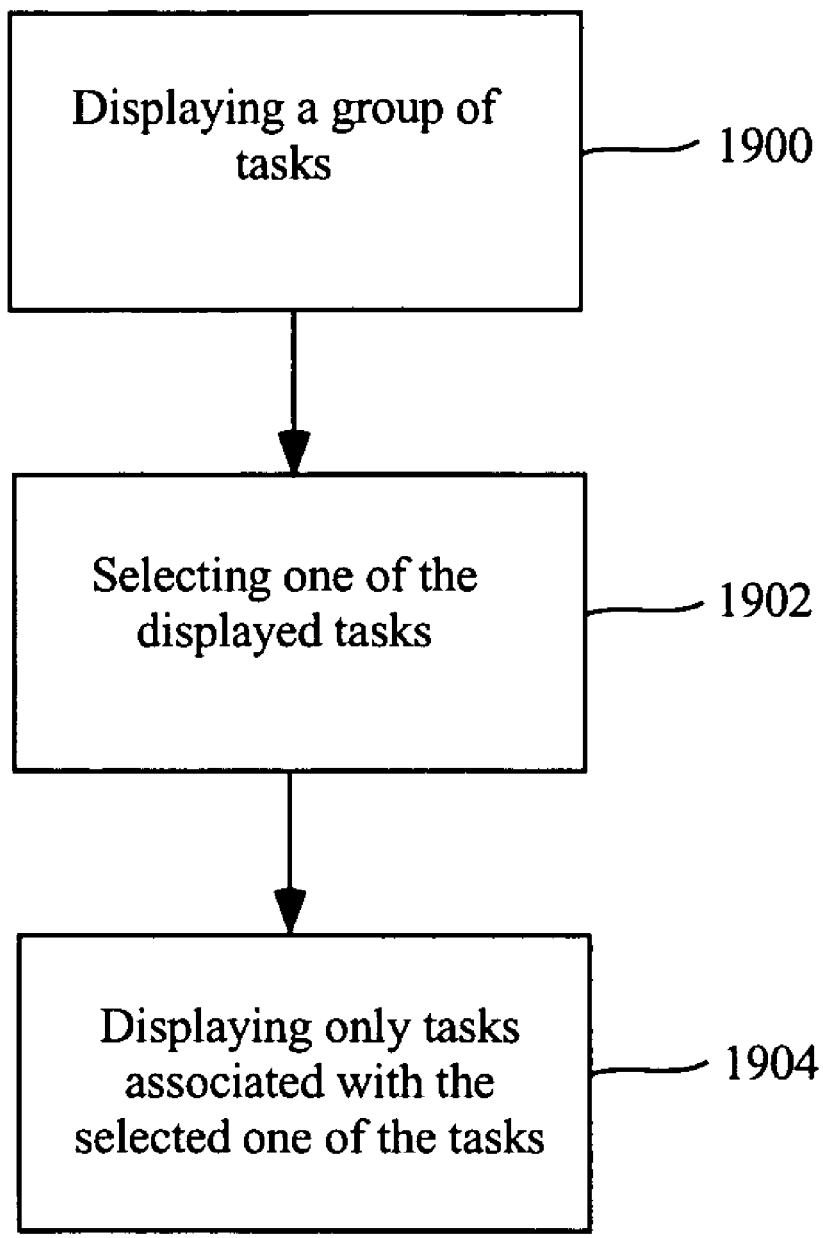
FIG. 19 is a flow diagram illustrating a method of displaying a program management chart in accordance with yet an additional embodiment of the present invention.

Referring next to FIG. 19, a flow diagram is shown illustrating a method of displaying tasks within a program management chart.

First a group of tasks is displayed to user 1900. The group of task can be either displayed as a program management chart or can be only displayed within one of the sub folder within the WBS tree.

Next a user selects one of the tasks 1902. The program management chart is then displayed only with those tasks that are predecessor or successor to the selected task 1904. In one preferred embodiment, the user can select whether to show all of the data associated with the selected task, or the user can select to only show predecessor or successor data.

This advantageously allows a user to determine which tasks are directly related (either by predecessor or successor) to the selected task without having to go though look at all of the other tasks within the program management chart.

Figure 20:
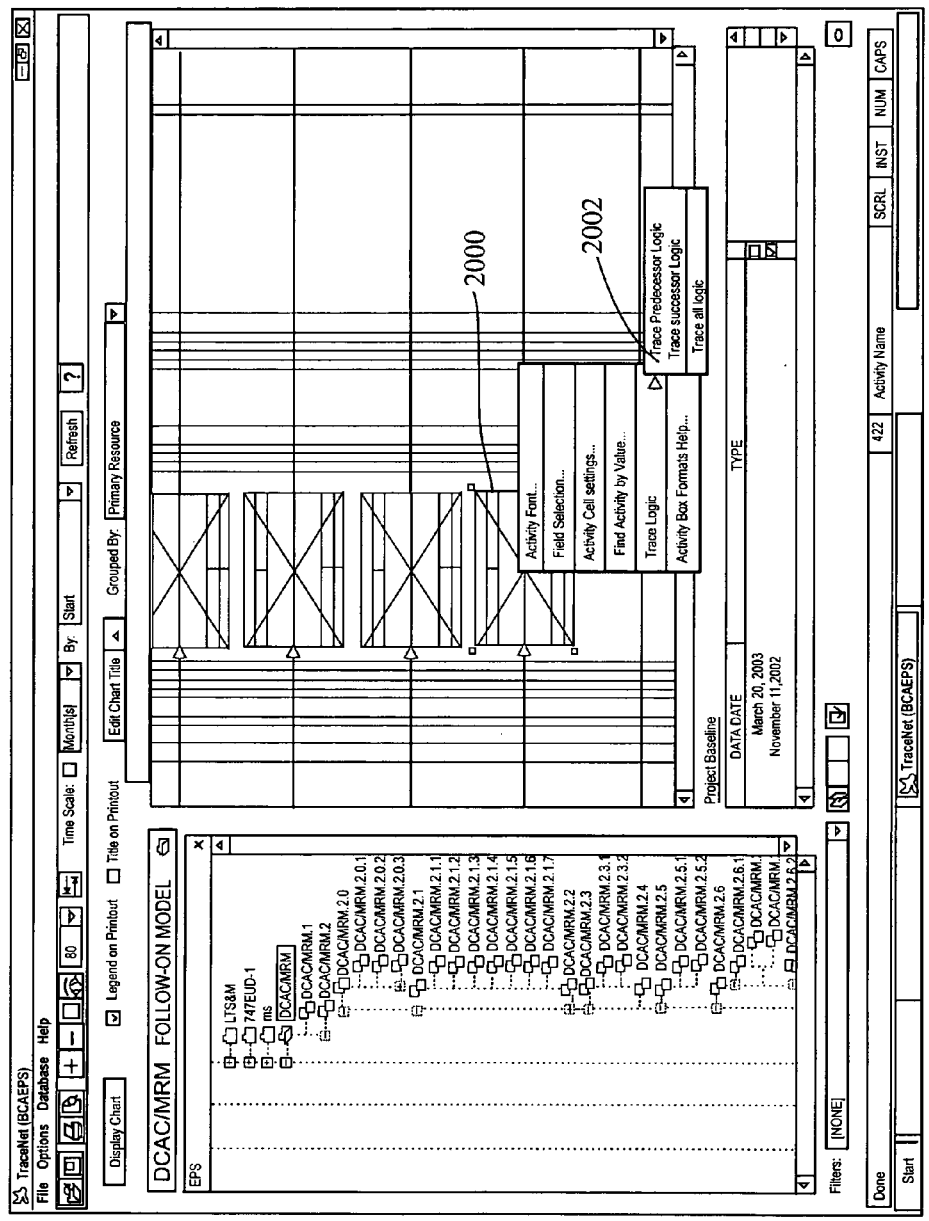
FIG. 20 is a diagram illustrating the selection of a task.

Referring next to FIG. 20, a diagram is shown illustrating a selected task for tracing the predecessor and successor tasks. Shown is a selected task 2000, and a trace logic option bar 2002. This allows a user to select a task a then choose to display predecessor tasks, successor task, or both.

Figure 21:
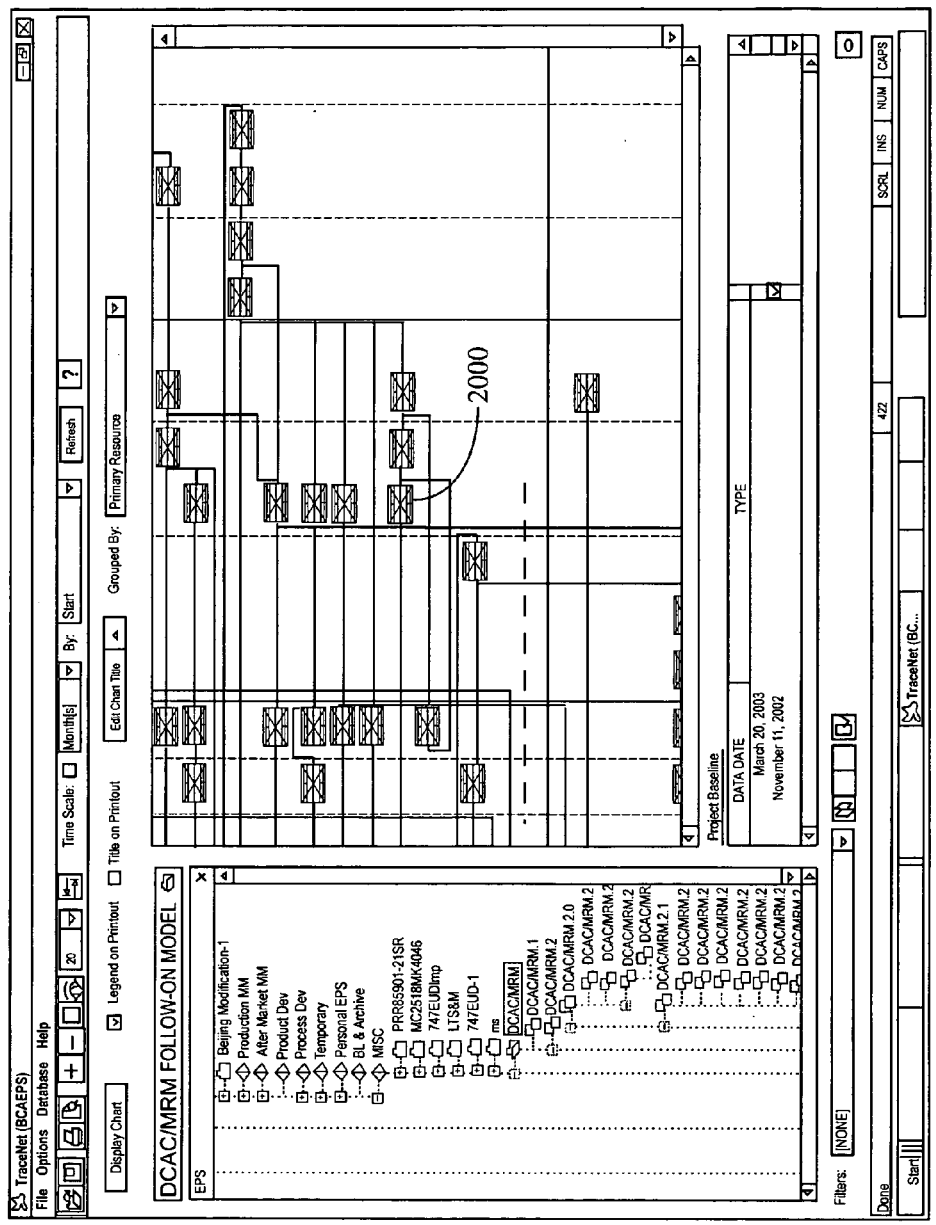
FIG. 21 is a diagram illustrating a selected task and all of the other tasks within the program management chart.

Referring next to FIG. 21, a diagram is shown illustrating the selected task 2000 shown with all of the tasks in the program management chart. Shown is the selected task 2000 with all of the other tasks in the program management chart.

Figure 22:
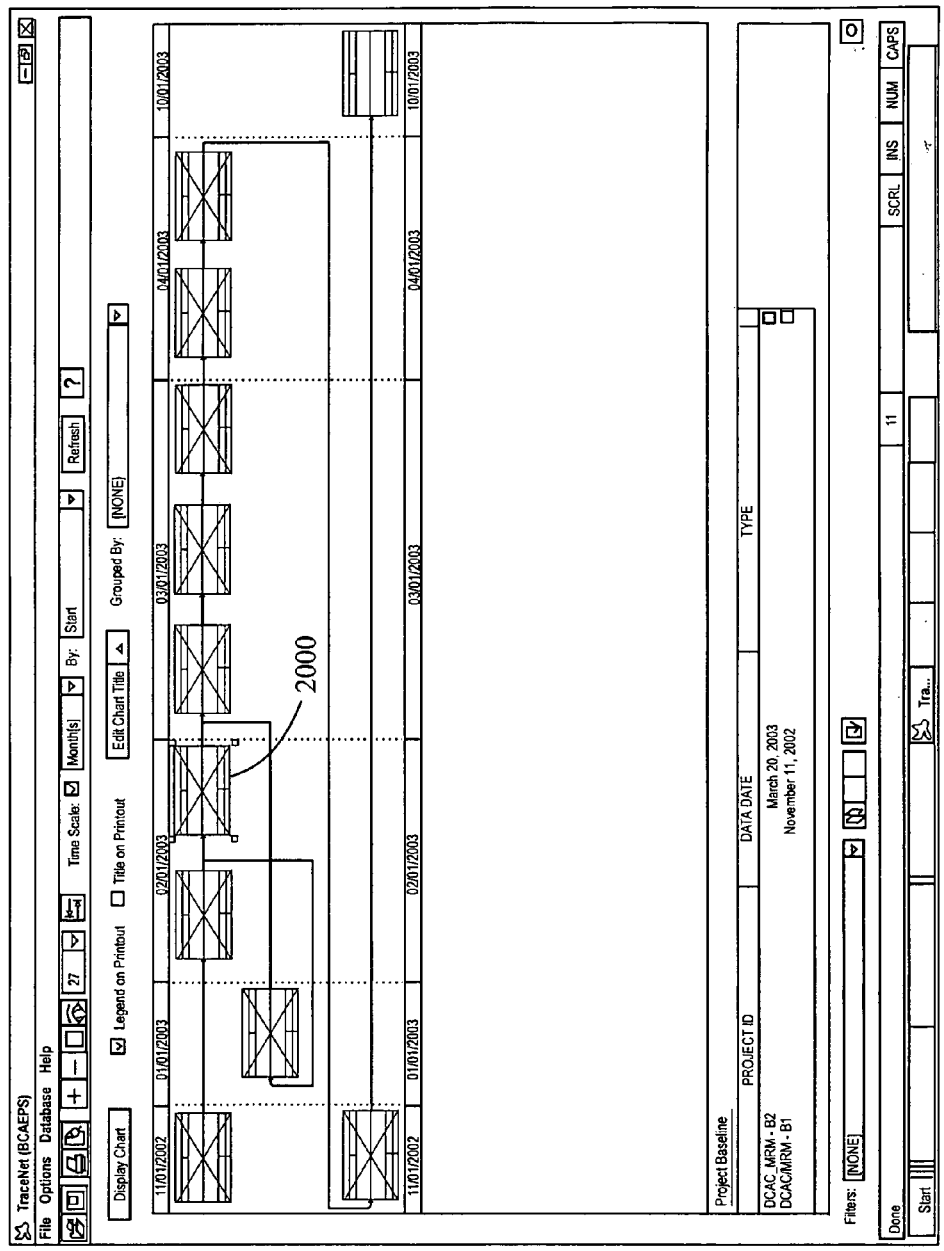
FIG. 22 is a diagram illustrating a second embodiment of a program management chart display in accordance with the method of FIG. 19.

Referring to next to FIG. 22, a diagram is shown illustrating the selected task 2000 shown with only predecessor and successor tasks. This provides the user with the ability to select a task and then determine within the project those tasks that must be completed before or after the selected task 2000 without having to view the entire program management chart.

While the invention herein disclosed has been described by means of specific embodiments and applications thereof, other modifications, variations, and arrangements of the present invention may be made in accordance with the above teachings other than as specifically described to practice the invention within the spirit and scope defined by the following claims.

I claim:

1. A computerized method of creating a program management chart comprising the steps of:
    displaying a plurality of tasks within a selected set of data as a first part of the program management chart;
    concurrently displaying, without opening a linked subfolder, one or more tasks, and at least one of header data and task data of the one or more tasks, outside of the selected set of data but associated with at least one of the plurality of tasks within the selected set of data as a second part of the program management chart;
    differentiating, without opening a linked subfolder, within the program management chart between the plurality of tasks within the selected set of data and the one or more tasks outside of the selected set of data which are associated with said at least one of the plurality of tasks within the selected set of data; and
    limiting the displaying of the one or more tasks outside of the selected set of data, without opening a linked subfolder, only to those one or more tasks associated with at least one of the plurality of tasks within the selected set of data.

2. The method of claim 1 wherein the one or more tasks outside of the selected set of data is outside of a project that contains the selected set of data.

3. The method of claim 1 further comprising accessing header data associated with at least one of the plurality of tasks within the selected set of data in order to display the one or more tasks outside of the selected set of data.

4. A computerized method of creating a program management chart comprising the steps of:
    accessing a subset of data within a project;
    displaying in the program management chart a plurality of tasks that are part of the project and associated with the subset of data;
    concurrently displaying, without opening a linked subfolder, one or more tasks, and at least one of header data and task data of the one or more tasks, that are part of the project and outside of the subset of data in the program management chart at the same time as the plurality of tasks that are part of the project and associated with the subset of data;
    differentiating, without opening a linked subfolder, between the plurality of tasks that are part of the project and associated with the subset of data and the one or more tasks that are part of the project and outside of the subset of data; and
    limiting the displaying of the one or more tasks outside of the subset of data, without opening a linked subfolder, only to those one or more tasks associated with at least one of the plurality of tasks associated with the subset of data.

5. The method of claim 4 further comprising the step of accessing a header relating to the one or more tasks outside of the subset of data.

6. The method of claim 4 further comprising accessing header data associated with at least one of the plurality of tasks within the subset of data in order to display the one or more tasks outside of the subset of data.

* * * * *